(12) United States Patent
Chang

(10) Patent No.: US 6,382,512 B1
(45) Date of Patent: May 7, 2002

(54) SIGNAL READING CONTROL APPARATUS FOR BARCODE SCANNER

(76) Inventor: Yu-Chun Chang, 4F, No. 225, Chin-Lung Rd., Nei-Hu Dist., Taipei (TW)

( * ) Notice: Subject to any disclaimer, the term of this patent is extended or adjusted under 35 U.S.C. 154(b) by 0 days.

(21) Appl. No.: 09/828,157

(22) Filed: Apr. 9, 2001

(51) Int. Cl.$^7$ .......................... G02B 26/10; G06K 7/10; G06K 9/22; G06K 19/06

(52) U.S. Cl. .............................. 235/462.25; 235/462.28; 235/462.27

(58) Field of Search ....................... 235/462.25, 462.28, 235/462.27

(56) References Cited

U.S. PATENT DOCUMENTS 5,902,989 A * 5/1999 Metlitsky et al. ...... 235/462.26
6,283,375 B1 * 9/2001 Wilz, Sr. et al. ........ 235/462.25

FOREIGN PATENT DOCUMENTS

JP          02000228789 A   *  8/2000

* cited by examiner

Primary Examiner—Michael G. Lee
Assistant Examiner—Daniel I Walsh
(74) Attorney, Agent, or Firm—Bacon & Thomas

(57) ABSTRACT

A signal reading control apparatus for barcode scanner comprises a Decoder and a laser engine. The laser engine includes an Analog circuit, a Tone Decoder, a Time Delay, a Flip Flop, an Oscillation circuit, a judging circuit, a scanner structure, a laser beam output, and a light detect sensor. When the button key of the barcode scanner is pressed, the scanner structure is not activated temporarily. Instead, a constant frequency oscillation wave is applied on a laser diode which emits photo points in an oscillating fashion. When a scanning object enters the readable range, the light detect sensor of the barcode scanner will receive a reflection signal of same frequency as the one applied on the photo points. When the signal frequency is same as the one emitting by the laser diode, it is confirmed that the object has entered the readable range. In the mean time, the laser photo points have projected on the barcode to be read, the barcode scanner will convert the laser diode to a constant current driving state and activate the scanner to scan the laser photo points in a linear fashion for reading the barcode.

4 Claims, 1 Drawing Sheet

SIGNAL READING CONTROL APPARATUS FOR BARCODE SCANNER

BACKGROUND OF THE INVENTION

This invention relates to a signal reading control apparatus for barcode scanner and particularly an apparatus that employs existing optical structure of barcode scanner and provides an indication light which contains carrier frequency to project on an object, and receives confirmation of reflection signal frequency to make sure that the object is located within the reading range, and confirms the barcode scanner has been correctly pointing toward the barcode, then activates a scan structure to read the barcode.

Barcode scanner is widely used nowadays as a point-of-sales terminal to count consumers' buying price at the counter. A cashier either takes the goods to scan in front of a barcode scanner, or takes a portable handheld barcode scanner to scan over the barcode of goods for reading the barcode image into the point-of-sale terminal for getting the price of each item and accumulated total amount at a display screen.

A conventional handheld barcode scanner starts scanning operation when a switch is pressed. One of such examples is a system capable of processing photoelectric signals for barcode scanners. The barcode scanner can read different reflection value from the barcode area and non-barcode area adjacent the barcode area. It includes a decoder for decoding input signals, a signal process circuit for processing signals output by the scanner and generates an input signal to feed into a decoder thereby to detect and delete the non-barcode area signals output by the scanner. The signal process circuit can generate a signal to input different barcode symbols into the decoder. The signal process circuit includes an eraser which has deleting function for deleting signals which have a shorter generation time period than a preset time period, one or two proportional calculator for calculating signal interval characteristics output by the scanner, and a second proportional calculator for calculating signal characteristics of non-barcode area output by the scanner. However the foregoing barcode scanner has disadvantages. First, when there is no object (barcode) presented in the effective reading range, the barcode scanner is still operational. The operation is meaningless and wastes electric power. Second, before the scanning lines are presented, there is no way of knowing if the scanner is correctly targeting the object.

There are other types of similar product being marketed. One of such products includes an additional reflective sensing element for detecting the object. Such an element usually can read at a distance of a few centimeter. A long distance barcode reader usually can read a distance of 15 cm, or 20 cm or even over 30 cm. Hence it is not desirable. Moreover, these types of reflective sensing element mostly are infrared light elements which have no object indication capability.

SUMMARY OF THE INVENTION

The primary object of this invention is to resolve aforesaid disadvantages, and to use the existing optical structure of the barcode scanner, and to provide an indication light which contains carrier frequency to project on an object, and to receive confirmation of the reflection signal frequency to make sure that the object is located within the reading range, and to confirm the barcode scanner has been correctly pointing toward the barcode before activating a scan structure for reading the barcode.

Another object of this invention is to correctly select the barcode to be read when targeting an object which has a plurality of barcodes printed thereon.

A further object of this invention is to use same optical structure and same signal receiving and amplifying circuit in the barcode scanner for the front stage detection operation and rear stage barcode reading operation to attain correct detection positioning and also to save power consumption.

BRIEF DESCRIPTION OF THE DRAWINGS

The inventions, as well as its many advantages, may be further understood by the following detailed description and drawings, in which.

DETAILED DESCRIPTION OF THE PREFERRED EMBODIMENT

Figure 1:
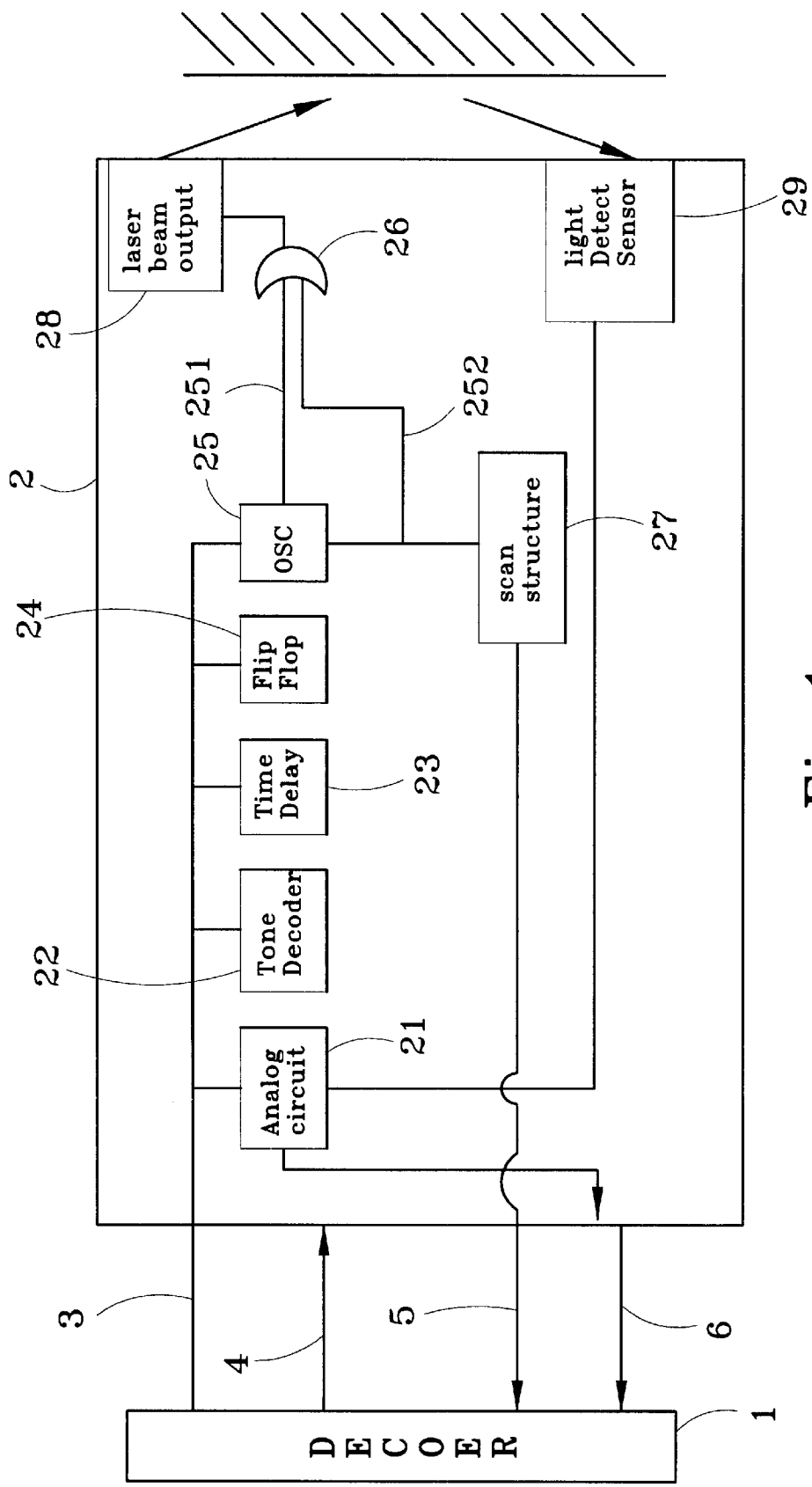
FIG. 1 is a circuit diagram of this invention.

Referring to FIG. 1, the signal reading control apparatus for barcode scanner according to his invention employs a hardware circuit which includes a Decoder 1 and a laser engine 2. The laser element generates light for detecting an object and indicating the correct barcode address. When the button key of the barcode scanner is pressed, the scan structure is not activated temporarily. Instead, a constant frequency oscillation wave is applied on the laser diode. The laser diode emits photo points in an oscillating fashion with an optical path same as that of the barcode scanner. When a scanning object enters the readable range, the detect sensor of the barcode scanner will receive a reflection signal of same frequency as the one added to the photo points. The signal is amplified and under wave forming process, and will give the output pin a correct reflection signal. At this stage, if the signal frequency is confirmed same as the one emitted by the laser diode, it can be confirmed that the object has entered the readable range. In the mean time, the laser photo points have projected on the barcode to be read, the barcode scanner will convert the laser diode to a constant current driving state and activates the scan structure to make the laser photo points become a scanning line for reading the barcode.

The laser engine 2 has dual transmission with the Decoder 1 and includes an Analog circuit 21, a Tone Decoder 22, a Time Delay 23, a Flip Flop 24, an Oscillation circuit (OSC) 25, a judging circuit (OR) 26, a scanner structure 27, a laser beam output 28, and a light detect sensor 29.

The Analog circuit 21 is for amplifying the electric characteristic signal output by the light detect sensor 29.

The Tone Decoder 22 is for receiving the amplified signal from the Analog circuit 21, confirming if the reflection signal is the same as the emitting signal to avoid wrongful judgement and cause wrongful action, and to output at a constant level transformation state after confirmation.

The Time Delay 23 is for delaying the output signal from the Tone Decoder 22.

The Flip Flop 24 is for receiving the output signal from the Time Delay 23 to lock or open the Flip Flop 24.

The OSC 25 is for generating an oscillatory frequency output.

The judging circuit 26 is an OR gate for receiving the oscillatory frequency output from the OSC 25 and activating the laser beam output 28.

The scanner structure 27 is for receiving the signal output from the OSC 25 and driving the scanner to start scanning operation.

The laser beam output 28 is for receiving the output signal from the judging circuit 26 and generating a projection light to the barcode of the object.

The light detect sensor 29 is for receiving the reflection signal from the object and converting to an electric characteristics output.

When in use, the Decoder 1 sends out a control signal to the laser engine 2 for enabling the scan enable 3 and laser enable 4. At this stage the scanner structure 27 of the laser engine 2 is not activated, hence the start of scan signal 5 for synchronously reading the signal that has been sent to the decoder 1 is also not being sent out, and the OSC 25 will output an oscillatory wave through a first output pin 251. At the initial stage and when no object is located at the front, the light detect sensor 29 does not receive a reflection signal, the second output pin 252 will be at a low electric level, and the oscillatory signal will be applied to a laser diode for emission. When an object enters the readable range, the emitting photo signal will be reflected, and through the light detect sensor 29, converted to an electric signal and forwarded to the Analog circuit 21. The signal is amplified and transmitted to the Tone decoder 22 which confirms if the reflection signal is the same as the emitting signal to avoid wrongful judgement or trigger wrongful action. Once confirmed, the Tone decoder 22 outputs at a constant level transformation state and through the Time delay 23 controls the Flip Flop 24 at a lock state. At this stage, the second output pin 252 is at a high electric level, the laser diode will be at a constant current operation state, and the scanner structure 27 starts operation, the photopoints being scanned in a linear fashion, and sends out a start of scan 5 signal for reading the barcode data output 6.

Aforesaid process is the front stage detection operation which uses same optical structure and same signal receiving and amplifying circuit as the rear stage reading barcode operation, thereby may attain correct detection positioning and save power consumption.

What is claimed is:

1. A signal control apparatus for a barcode scanner consisting of a decoder and a laser engine, the laser engine comprising:

a laser beam output for generating light to project on an object;

a light detect sensor for receiving a reflection signal from the object and converting the reflection signal to an electric characteristic signal output by the light detect sensor;

an analog circuit for amplifying the electric characteristic signal output by the light detect sensor, a tone decoder for receiving the amplified signal from the analog circuit, confirming if the reflection signal is same as an emitting signal to avoid wrongful judgement or cause wrongful action, and to output at a constant level transformation state after confirmation;

a time delay for delaying an output signal from the tone decoder;

a flip flop for receiving the output signal from the time delay to lock or open the flip flop;

an oscillation circuit for generating an oscillatory frequency output signal; and a scanner structure for receiving the oscillatory frequency output signal and driving the scanner to start scanning operation;

wherein the tone decoder sends out a control signal to the laser engine for enabling a scan enable and a laser enable while the scanner structure of the laser engine remains non-activated such that a start of a scan signal and a synchronously reading signal that has been sent to the decoder is not sent out, the oscillation circuit sending out an oscillatory wave through a first output pin, and wherein at an initial stage when no object is located at front, the light detect sensor receives no reflection signal and a second output pin is at a low electric level, the oscillator frequency output signal being applied on the laser beam output for emission; and wherein when an object enters a readable range and causes reflection of an emitting photo signal which is converted to an electrical signal through the light detect sensor and forwarded to the analog circuit for amplification processing, the amplified signal is transmitted to the tone decoder which confirms if the reflection signal is the same as the emitting signal, and through the time delay controls the flip flop at a lock state so that the second output pin reaches a high electric level, and so that the laser diode is at a constant current operation state, the scanner structure starting operation and laser photo points being scanned in a linear fashion for sending out a start of scan signal for reading the barcode data output.

2. The signal control apparatus of claim 1 further having a judging circuit for receiving the oscillatory frequency output by the oscillation circuit and activating the laser beam output.

3. The signal control apparatus of claim 2, wherein the judging circuit is an OR gate.

4. The signal control apparatus of claim 1, wherein front stage detection operation of the signal control apparatus of the barcode scanner uses same optical structure and same signal receiving and amplifying circuits as rear stage reading barcode operation for correctly detecting positioning and saving power consumption.

* * * * *